(12) United States Patent
Rangarajan et al.

(10) Patent No.: US 8,160,230 B1
(45) Date of Patent: Apr. 17, 2012

(54) INTEGRATED NUMBER PORTABILITY AND USER MOBILITY FOR A COMMUNICATION SYSTEM

(75) Inventors: Ramaswami Rangarajan, Belmont, CA (US); Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1159 days.

(21) Appl. No.: 11/955,859

(22) Filed: Dec. 13, 2007

(51) Int. Cl.
*H04M 7/00* (2006.01)

(52) U.S. Cl. ............... 379/220.01; 379/221.13; 455/433

(58) Field of Classification Search ............. 379/220.01, 379/221.13; 455/433
See application file for complete search history.

(56) References Cited

U.S. PATENT DOCUMENTS

| | | | |
|---|---|---|---|
| 6,934,530 B2 | 8/2005 | Engelhart | |
| 7,839,987 B1 * | 11/2010 | Kirchhoff et al. | 379/142.02 |
| 2004/0203580 A1 | 10/2004 | Engelhart | |
| 2005/0243863 A1 | 11/2005 | Engelhart | |
| 2006/0039397 A1 | 2/2006 | Hari et al. | |
| 2010/0098241 A1 * | 4/2010 | Laster et al. | 379/221.13 |

\* cited by examiner

*Primary Examiner* — Quynh Nguyen (57) ABSTRACT

A computer system receives a first message from an originating communication node indicating a telephone number for a user. The computer system processes the telephone number, number portability data, and user mobility data to identify a first route number for a home communication node and a second route number for a visited communication node currently serving the user. The computer system transfers a second message to the originating communication node indicating the first route number and the second route number. The call may be routed from the originating communication node to the visited communication node based on the second route number, but if the visited communication node is unable to complete the call, the call may be routed from the originating communication node to the home communication node based on the first route number.

20 Claims, 6 Drawing Sheets

INTEGRATED NUMBER PORTABILITY AND USER MOBILITY FOR A COMMUNICATION SYSTEM

TECHNICAL BACKGROUND

The communication infrastructure has implemented number portability to allow a user to keep their telephone number when they change communication service providers. Prior to the change of service providers, the communication infrastructure processes the user's telephone number to route calls to a home switch that serves the user's telephone. After the change, a new home switch will serve the user's telephone, and this new home switch has a route number. To implement number portability, a number portability database stores the user's telephone number in association with the route number for the new home switch. When a call is subsequently placed to the user's telephone number, the communication infrastructure transfers a message with the user's telephone number to the number portability database, and the number portability database returns a message with the route number for the new home switch. The communication infrastructure then processes the route number to route the call to the new home switch that serves the user's telephone.

The communication infrastructure has also implemented user mobility to allow the user to move around and receive calls at various locations. If the user moves to a remote location that is served by a remote switch, then the remote switch transfers the user's telephone number and a route number for the remote switch to a user mobility database. When a call is placed to the user's telephone number, the communication infrastructure routes the call to the user's home switch. If the user is not registered with the home switch, the home switch transfers a message with the user's telephone number to the user mobility database, and the user mobility database returns a message with the route number for the remote switch. The communication infrastructure then processes the route number for the remote switch to route the call from the home switch to the remote switch that currently serves the user's telephone.

On a call to a mobile user who has ported their telephone number and who is currently at a remote location, the communication infrastructure transfers a message with the user's telephone number to the number portability database, and the number portability database returns a message with a route number for the user's new home switch. The communication infrastructure typically routes the call to the new home switch based on the route number. The new home switch then transfers another message with the user's telephone number to the user mobility database, and the user mobility database returns a message with another route number for a remote switch currently serving the user. The communication infrastructure then processes the other route number to route the call to the remote switch.

OVERVIEW

A computer system receives a first message from an originating communication node indicating a telephone number for a user. The computer system processes the telephone number, number portability data, and user mobility data to identify a first route number for a home communication node and a second route number for a visited communication node currently serving the user. The computer system transfers a second message to the originating communication node indicating the first route number and the second route number. The call may be routed from the originating communication node to the visited communication node based on the second route number, but if the visited communication node is unable to complete the call, the call may be routed from the originating communication node to the home communication node based on the first route number.

DETAILED DESCRIPTION

Figure 1:
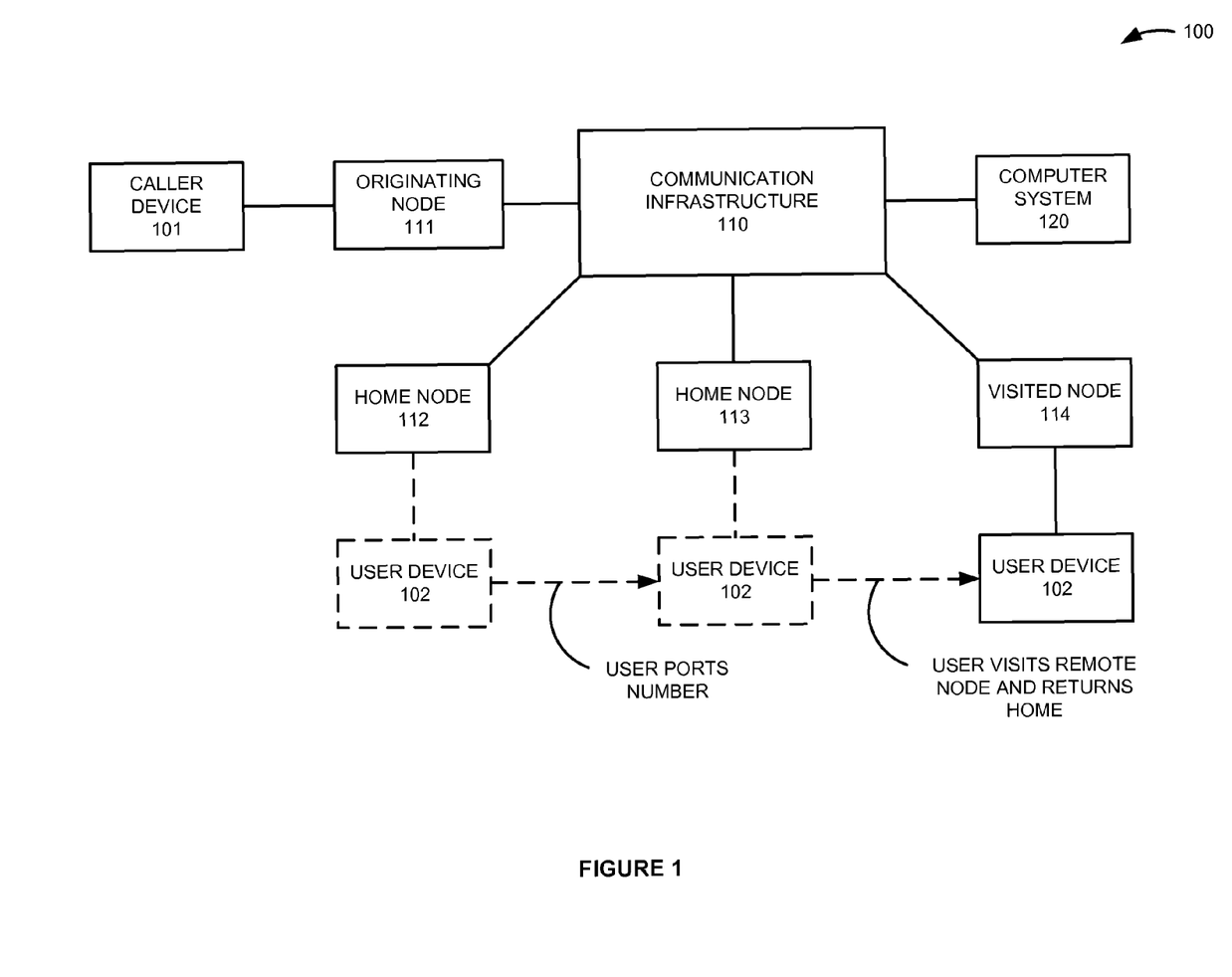
FIG. 1 is a block diagram that illustrates a communication system.

FIG. 1 is a block diagram that illustrates communication system 100. Communication system 100 includes caller communication device 101, user communication device 102, communication infrastructure 110, originating communication node 111, home communication node 112, home communication node 113, visited communication node 114, and computer system 120. Advantageously, computer system 120 integrates number portability and user mobility processing for improved routing efficiency and faster call set-up.

Caller communication device 101 is linked to originating communication node 111. User communication device 102 is linked to different ones of communication nodes 112-114 at various times as described below. Communication infrastructure 110 is linked to communication nodes 111-114 and to computer system 120. These links could use various communication media, such as air, metal, optical fiber, or some other signal propagation path—including combinations thereof. These links could use various protocols, such as internet, telephony, worldwide interoperability for microwave access, or some other communication format—including combinations thereof. These links could be direct links or they might include various intermediate components, systems, and networks.

Caller communication device 101 and user communication device 102 comprise telephones, digital assistants, computers, internet appliances, wireless transceivers, or some other user communication apparatus—including combinations thereof. Communication nodes 111-114 comprise class 4 telephone switches, class 5 telephone switches, mobile switching centers, wireless communication nodes, voice over internet protocol nodes, or some other type of communication processing systems. Communication infrastructure 110 comprises an internet protocol network, telephony network, signaling network, optical network, wireless network, or some other type of communication network—including combinations thereof. Communication infrastructure 110 and communication nodes 111-114 and may be distributed across multiple communication service providers. In some examples, home communication node 112 and home communication node 113 are operated by different communication service providers.

Figure 2:
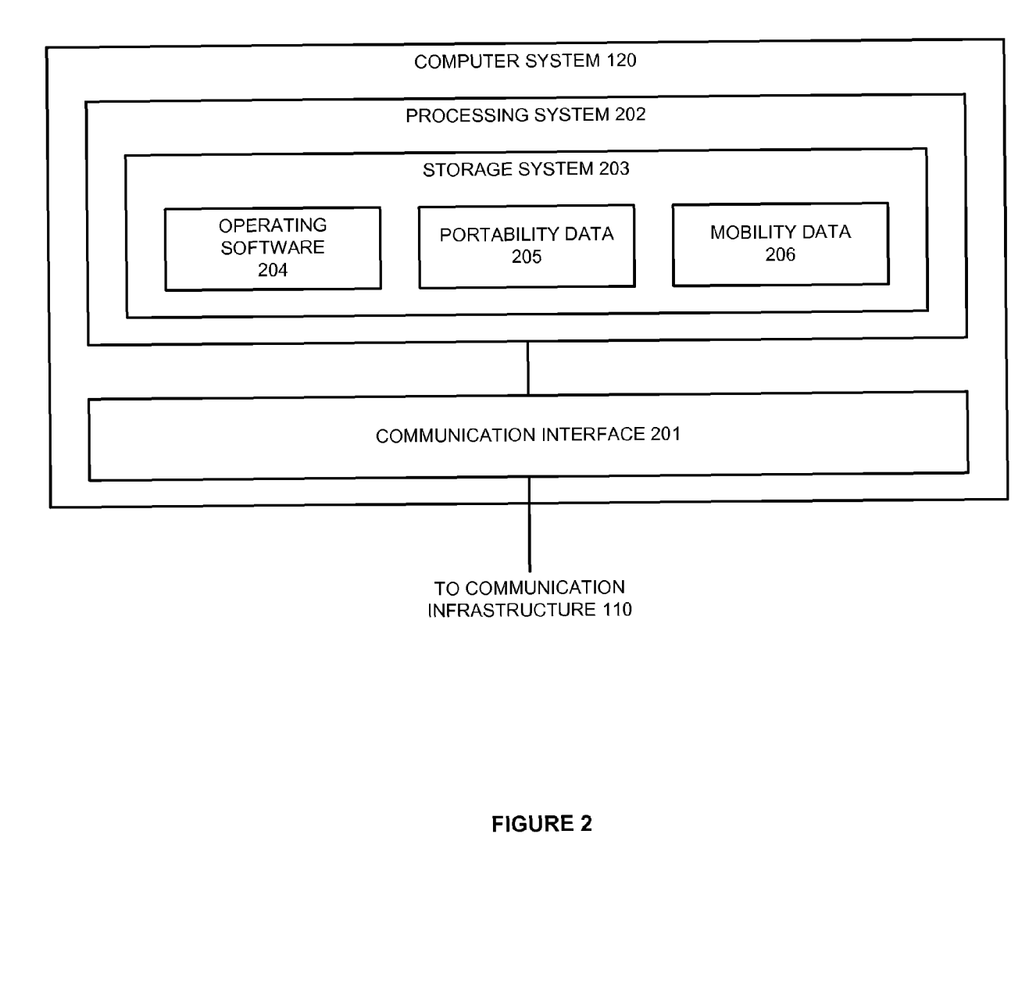
FIG. 2 is a block diagram that illustrates a computer system.

FIG. 2 is a block diagram that illustrates computer system 120. Computer system 120 includes communication interface 201 and processing system 202. Processing system 202 includes storage system 203. Storage system 203 stores operating software 204, number portability data 205, and user mobility data 206. Communication interface 201 is linked to processing system 202 over a bus structure, backplane, local area network, or some other type of communication apparatus. In some examples, communication interface 201 and processing system 202 are located at a single physical site.

Communication interface 201 comprises network interfaces, communication ports, transceivers, or some other type of communication devices. Communication interface 201 comprises a signaling interface, such a signaling system seven stack, session initiation protocol stack, or some other signaling protocol component. Communication interface 201 may be distributed among multiple communication devices. Communication interface 201 receives and transmits messages under the control of processing system 202 as described below.

Processing system 202 comprises microprocessors, logic circuitry, or some other type of processing devices. Processing system 202 may be distributed among multiple processing devices. Storage system 203 comprises a disk, memory circuitry, storage drive, or some other type of memory device. Storage system 204 may be distributed among multiple memory devices. Processing system 202 retrieves and executes operating software 204 from storage system 203. Operating software 204 comprises an operating system, application program, or some other form of machine-readable processing instructions. When executed by processing system 202, operating software 204 directs computer system 120 to operate as described below.

Figure 3:
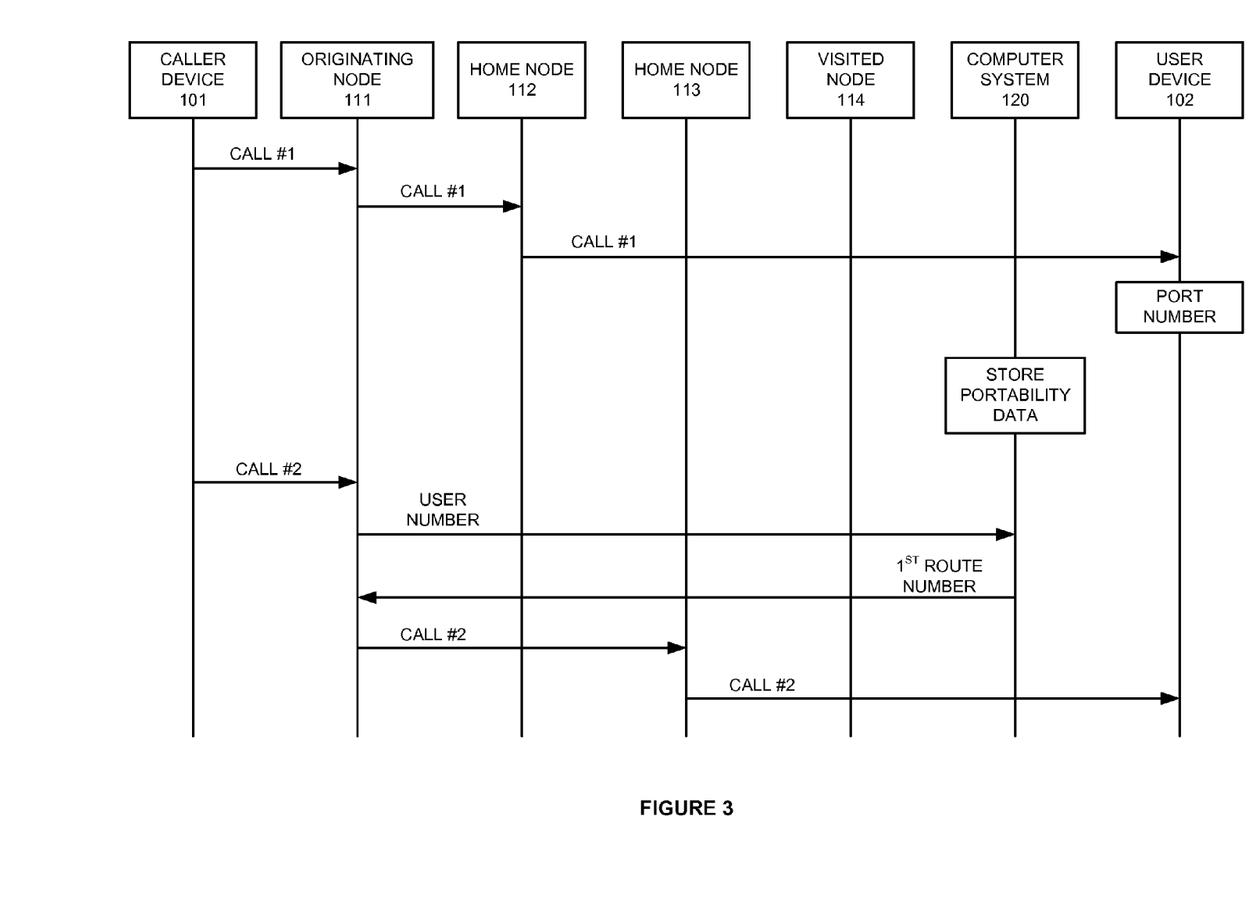
FIG. 3 is a sequence diagram that illustrates the operation of a communication system.
Figure 4:
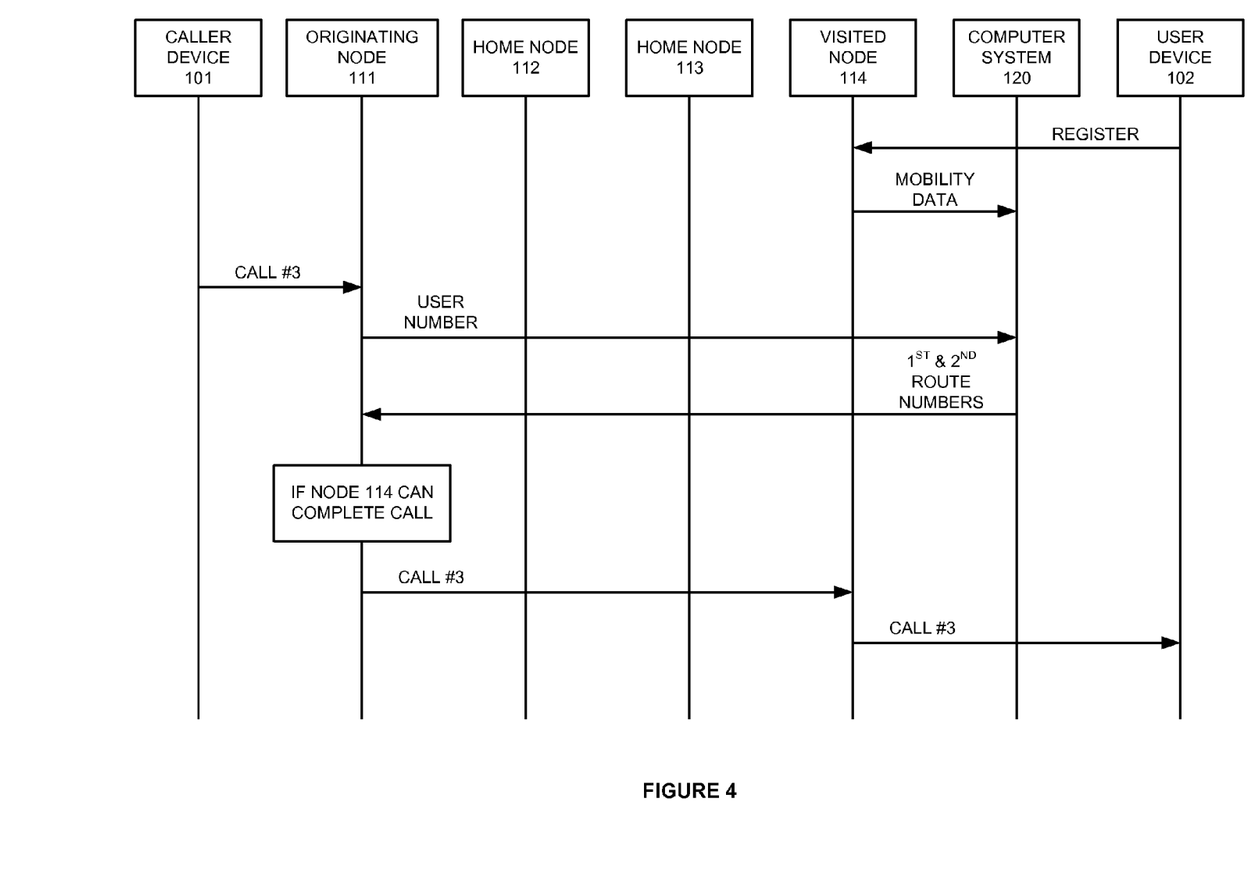
FIG. 4 is a sequence diagram that illustrates the operation of a communication system.
Figure 5:
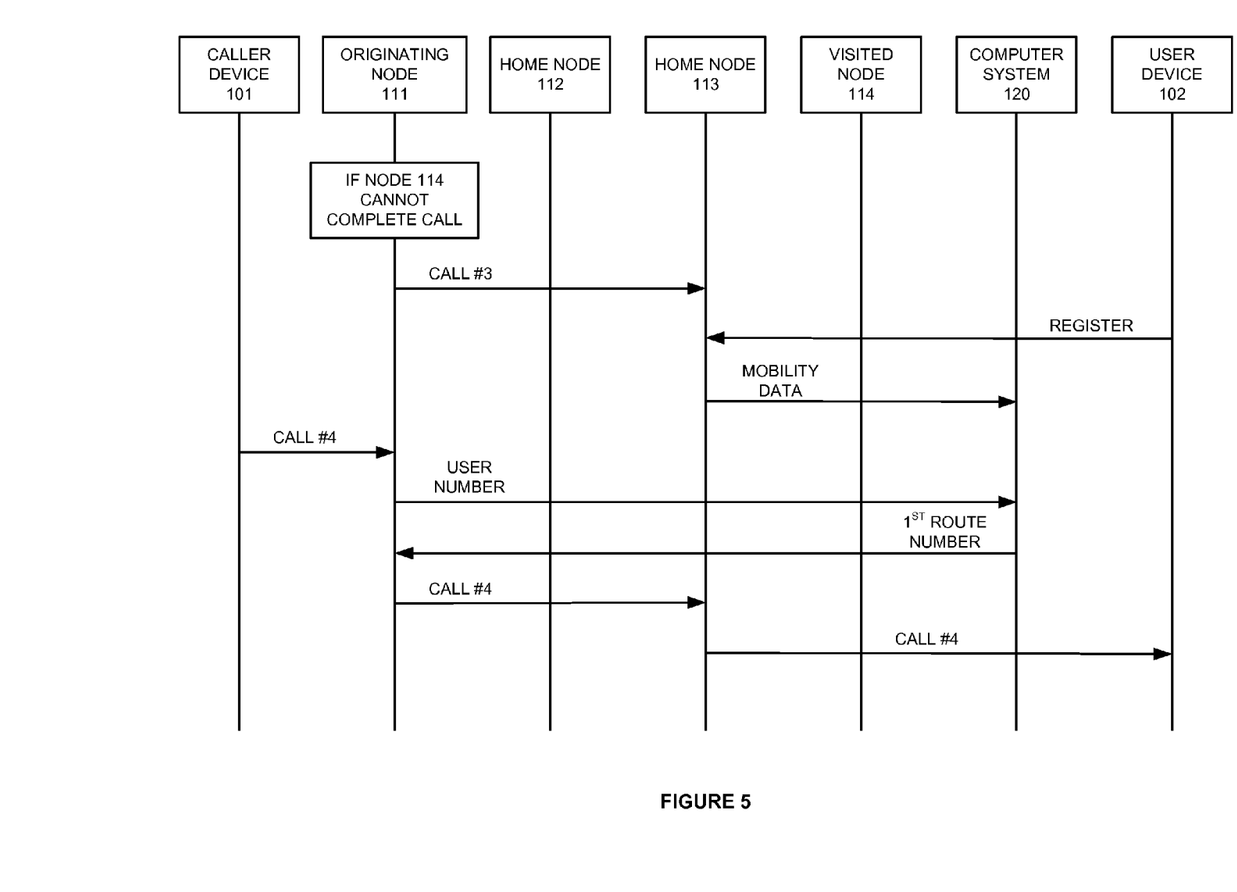
FIG. 5 is a sequence diagram that illustrates the operation of a communication system.

FIGS. 3-5 are sequence diagrams that illustrate the operation of communication system 100. Although nodes 111-114 and computer system 120 communicate over communication infrastructure 110, infrastructure 110 is omitted from FIGS. 3-5 for clarity. Before the sequence, the telephone number of user communication device 102 is homed to home communication node 112, so calls placed to the telephone number are routed to home communication node 112 for delivery to user communication device 102. To begin the sequence, caller communication device 101 places a first call through originating communication node 111 to the telephone number for user communication device 102. Originating communication node 111 processes the telephone number to route the first call to home communication node 112. Home communication node 112 routes the first call to user communication device 102.

After the first call, the user ports their telephone number to a new service provider, and as a result, the telephone number for user communication device 102 is re-homed to home communication node 113. To accomplish the re-homing, number portability data 205 that associates the telephone number with a first route number for home communication node 113 is stored in computer system 120. The first route number comprises an NPA-NXX, internet address, switch code, link identifier, or some other data that can be used to route a call to home communication node 113.

After the telephone number has been ported, caller communication device 101 places a second call through originating communication node 111 to the telephone number for user communication device 102. Originating communication node 111 processes the telephone number, and since the telephone number has been ported, originating communication node 111 transfers a message indicating the ported telephone number to computer system 120. Computer system 120 processes the ported telephone number and number portability data 205 to return a message to originating communication node 111 indicating the first route number for home communication node 113. Originating communication node 111 processes the first route number to route the second call to home communication node 113. Home communication node 113 routes the second call to user communication device 102.

Referring to FIG. 4, user communication device 102 moves to an area served by visited communication node 114 and registers with visited communication node 114. In response to the registration, visited communication node 114 transfers user mobility data 206 to computer system 120. User mobility data 206 associates the telephone number for user communication device 102 with a second route number for visited communication node 114. The second route number comprises an NPA-NXX, internet address, switch code, link identifier, or some other data that can be used to route a call to visited communication node 114.

Caller communication device 101 places a third call through originating communication node 111 to the telephone number for user communication device 102. Originating communication node 111 processes the telephone number, and since the telephone number has been ported, communication node 111 transfers a message indicating the ported telephone number to computer system 120. Computer system 120 processes the ported telephone number and number portability data 205 to identify the first route number for home communication node 113. Computer system 120 also processes the ported telephone number and user mobility data 206 to identify the second route number for visited communication node 114. Computer system 120 returns a message to originating communication node 111 indicating the first route number and the second route number. The message also indicates that the second route number has priority.

Originating communication node 111 processes the second route number to determine if visited communication node 114 can complete the third call to user communication device 102. If so, originating communication node 111 processes the second route number route the third call to visited communication node 114, and visited communication node 114 routes the third call to user communication device 102. Note that the third call was routed from originating communication node 111 to visited communication node 114 based on the second route number without routing the call through the home communication node 113.

Referring to FIG. 5, if visited communication node 114 cannot complete the call to user communication device 102, then originating communication node 111 processes the first route number to route the third call to home communication node 113. Home communication node 113 may be able to complete the third call or provide some other call treatment, such as voicemail.

User communication device 102 then moves back to their home area served by home communication node 113 and registers with home communication node 113. In response to the registration, home communication node 113 transfers user mobility data 206 to computer system 120. User mobility data 206 associates the telephone number for user device 102 with the first route number for home communication node 113.

Caller communication device 101 places a fourth call through originating communication node 111 to the telephone number for user communication device 102. Originating communication node 111 processes the telephone number, and since the number has been ported, communication node 111 transfers a message indicating the ported telephone number to computer system 120. Computer system 120 processes the ported telephone number and number portability data 205 to identify the first route number for home communication node 113. Computer system 120 also processes the ported telephone number and user mobility data 206 to identify the first route number for home communication node 113. Computer system 120 returns a message to originating communication node 111 indicating the first route number for home communication node 113. Originating communication node 111 processes the first route number to route the fourth call to home communication node 113. Home communication node 113 routes the fourth call to user communication device 102.

Figure 6:
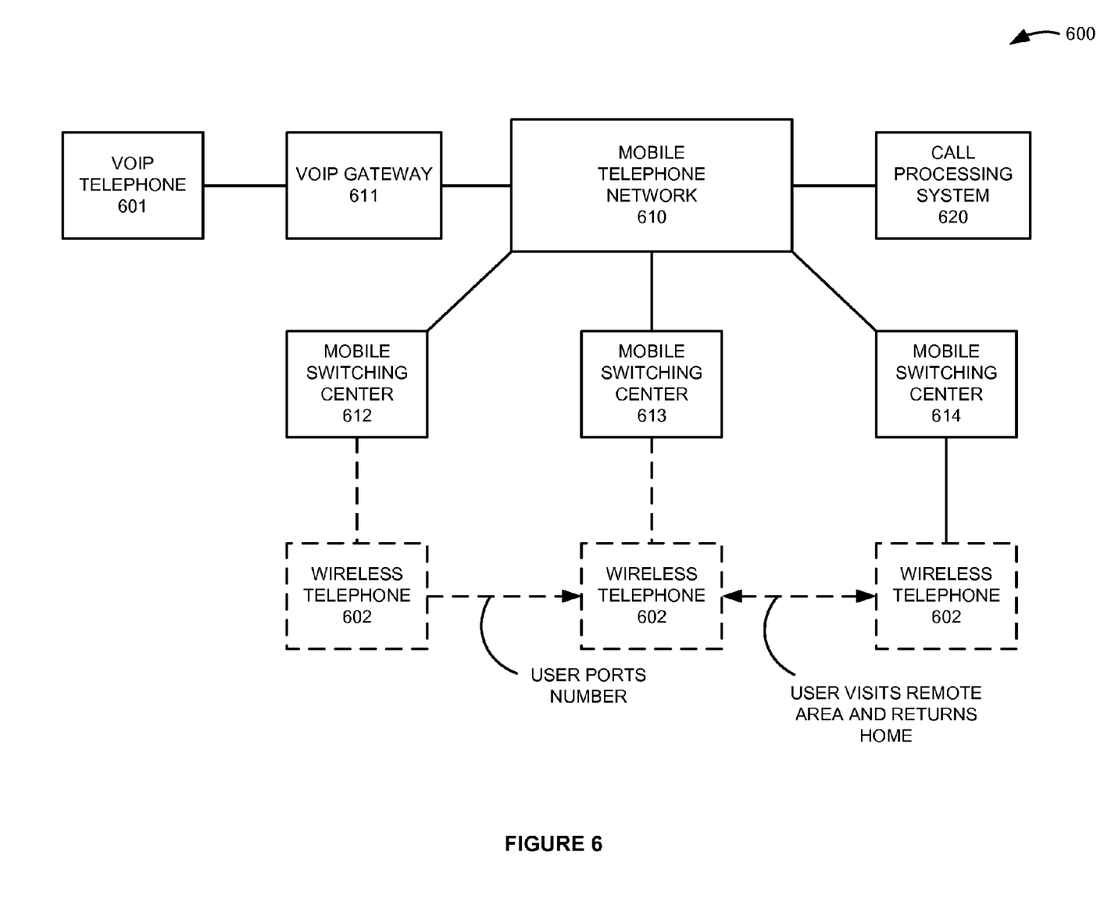
FIG. 6 is a block diagram that illustrates a communication system and its operation.

FIG. 6 is a block diagram that illustrates communication system 600 and its operation. Communication system 600 includes Voice Over Internet Protocol (VoIP) telephone 601, wireless telephone 602, mobile telephone network 610, VoIP gateway 611, Mobile Switching Centers (MSCs) 612-614, and call processing system 620. VoIP telephone 601 is linked to VoIP gateway 611. Wireless telephone 602 is linked to individual MSCs 612-614 at various times. Mobile telephone network 610 is linked to VoIP gateway 611, MSCs 612-614, and call processing system 620. These links comprise conventional communication signal paths and may include various intermediate systems. Call processing system 620 is configured and operates as described above for computer system 120.

Initially, the telephone number for wireless telephone 602 is homed to MSC 612, so calls placed to the telephone number are routed to MSC 612 for delivery to wireless telephone 602. The user then ports their telephone number to a new service provider who operates MSC 613, so the telephone number for wireless telephone 602 is re-homed to MSC 613. To re-home, number portability data that associates the telephone number for wireless telephone 602 with a first route number for MSC 613 is stored in call processing system 620. The first route number comprises an NPA-NXX, internet address, or some other code for MSC 613.

After the telephone number has been ported, wireless telephone 602 moves to a remote area and registers with MSC 614. In response to the registration, MSC 614 transfers user mobility data to call processing system 620. User mobility data associates the telephone number for wireless telephone 602 with a second route number for MSC 614. The second route number comprises an NPA-NXX, internet address, or some other code for MSC 614.

At this point, VoIP telephone 601 places a call through VoIP gateway 611 to the telephone number for wireless telephone 602. VoIP gateway 611 processes the telephone number to transfer a message indicating the telephone number to call processing system 620. Call processing system 620 processes the telephone number, number portability data, and user mobility data to identify the first route number for MSC 613 and the second route number for MSC 614. Call processing system 620 returns a message to VoIP gateway 611 indicating the first route number and the second route number with the second route number having priority.

VoIP gateway 611 processes the second route number to determine if MSC 614 can complete the call to wireless telephone 602. If so, VoIP gateway 611 processes the second route number to route the call to MSC 614, and MSC 614 routes the call to wireless telephone 602. Note that the call was routed from VoIP gateway 611 to visited MSC 614 without routing the call through home MSC 613. If MSC 614 were unable to complete the call to wireless telephone 602, then VoIP gateway 611 processes the first route number to route the call to MSC 613. MSC 613 may be able to complete the call or provide some other call treatment, such as voicemail.

Wireless telephone 602 then moves back to the area served by MSC 613 and registers with MSC 613. In response to the registration, MSC 613 transfers user mobility data to call processing system 620. The user mobility data associates the telephone number for wireless telephone 602 with the first route number for MSC 613.

VoIP telephone 601 then places another call through VoIP gateway 611 to the telephone number for wireless telephone 602. VoIP gateway 611 processes the telephone number to transfer a message indicating the telephone number to call processing system 620. Call processing system 620 processes the telephone number, number portability data, and user mobility data to identify the first route number for MSC 613. Call processing system 620 returns a message to VoIP gateway 611 indicating the first route number. VoIP gateway 611 processes the first route number to route the call to MSC 613, and MSC 613 routes the call to user wireless telephone 602.

Advantageously, call processing system 620 integrates number portability and user mobility processing for improved routing efficiency and faster call set-up.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   receiving a first message from an originating communication node wherein the first message indicates a telephone number for a user;
   processing the telephone number and number portability data to identify a first route number for a home communication node;
   processing the telephone number and user mobility data to identify a second route number for a visited communication node currently serving the user; and
   transferring a second message to the originating communication node wherein the second message indicates the first route number for the home communication node and the second route number for the visited communication node.

2. The method of claim 1 further comprising routing the call from the originating communication node to the visited communication node based on the second route number without routing the call through the home communication node.

3. The method of claim 1 further comprising routing the call from the originating communication node to the home communication node based on the first route number if the visited communication node is unable to complete the call.

4. The method of claim 2 wherein receiving the first message and transferring the second message comprises receiving the first message into a computer system and transferring the second message from the computer system.

5. The method of claim 4 wherein the number portability data and the user mobility data are stored in the computer system.

6. The method of claim 2 further comprising transferring the user mobility data including the second route number from the visited communication node to the computer system in response to the user visiting the visited communication node.

7. The method of claim 2 wherein the visited communication node comprises a mobile switching center.

8. The method of claim 7 wherein the originating communication node comprises one of a class 4 telephone switch and a class 5 telephone switch.

9. The method of claim 2 wherein the visited communication node comprises a wireless communication node.

10. The method of claim 9 wherein the originating communication node comprises a voice over internet protocol node.

11. A communication system comprising:
- a communication interface configured to receive a first message from an originating communication node wherein the first message indicates a telephone number for a user;
- a processing system configured to process the telephone number and number portability data to identify a first route number for a home communication node and to process the telephone number and user mobility data to identify a second route number for a visited communication node currently serving the user; and
- the communication interface is further configured to transfer a second message to the originating telecommunication node wherein the second message indicates the first route number for the home communication node and the second route number for the visited communication node.

12. The communication system of claim 11 further comprising a communication network configured to route the call from the originating communication node to the visited communication node based on the second route number without routing the call through the home communication node.

13. The communication system of claim 11 further comprising a communication network configured to route the call from the originating communication node to the home communication node based on the first route number if the visited communication node is unable to complete the call.

14. The communication system of claim 12 wherein the communication interface and the processing system are located at a single site.

15. The communication system of claim 14 wherein the processing system includes a storage system and the number portability data and the user mobility data are stored in the storage system.

16. The communication system of claim 12 wherein the visited communication node is configured to transfer the user mobility data including the second route number to the communication interface in response to the user visiting the visited communication node.

17. The communication system of claim 16 wherein the visited communication node comprises a mobile switching center.

18. The communication system of claim 17 wherein the originating communication node comprises one of a class 4 telephone switch and a class 5 telephone switch.

19. The communication system of claim 16 wherein the visited communication node comprises a wireless communication node.

20. The communication system of claim 19 wherein the originating communication node comprises a voice over internet protocol node.

* * * * *